United States Patent
Mardente et al.

(10) Patent No.: US 12,463,918 B2
(45) Date of Patent: Nov. 4, 2025

(54) DECENTRALIZED APPROACH TO IDENTIFY OBJECTS ACROSS A FEDERATION IN A NETWORK

(71) Applicant: Cisco Technology, Inc., San Jose, CA (US)

(72) Inventors: Gianluca Mardente, Girifalco (IT); Giovanni Meo, Rome (IT); Giuseppe Monterosso, London (GB); Massimiliano Ardica, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 18/608,513

(22) Filed: Mar. 18, 2024

(65) Prior Publication Data

US 2025/0293990 A1    Sep. 18, 2025

(51) Int. Cl.
*H04L 47/70* (2022.01)
*H04L 47/24* (2022.01)

(52) U.S. Cl.
CPC .............. *H04L 47/70* (2013.01); *H04L 47/24* (2013.01)

(58) Field of Classification Search
None
See application file for complete search history.

(56) References Cited

U.S. PATENT DOCUMENTS

| | | |
|---|---|---|
| 2015/0263980 A1 | 9/2015 | Kasturi et al. |
| 2016/0087885 A1 | 3/2016 | Tripathi et al. |
| 2020/0007584 A1* | 1/2020 | Dixit .................. H04L 41/5019 |
| 2020/0401452 A1 | 12/2020 | Piercey et al. |
| 2021/0409486 A1 | 12/2021 | Martinez et al. |
| 2022/0156115 A1* | 5/2022 | Zeng ...................... G06F 9/505 |
| 2024/0039957 A1* | 2/2024 | Thirumurthi ........... H04L 47/32 |
| 2025/0030451 A1* | 1/2025 | Silverman ........... H04W 56/002 |
| 2025/0030743 A1* | 1/2025 | Sundararajan ...... H04L 63/0236 |

* cited by examiner

*Primary Examiner* — June Sison
(74) *Attorney, Agent, or Firm* — Lee & Hayes, P.C.

(57) ABSTRACT

Techniques and architecture are described for identifying objects, e.g., resources, across a federation in a network, and more particularly, to identifying objects, e.g., resources, across a federation of access networks, e.g., fabric networks, for extending access of the objects across the federation in a network. More particularly, the techniques and architecture provide for adding global tags to local resources within an access network, e.g., a fabric network. Once a resource has a global tag attached to it, this information is shared with all other fabrics. Each fabric can then build its own view of where global resources are located. A local resource with the same set of global tags may be seen as the same global resource across multiple fabrics. Simply changing global tags attached to a local resource allows for reclassifying local resources. No other configuration change is required.

20 Claims, 7 Drawing Sheets

DECENTRALIZED APPROACH TO IDENTIFY OBJECTS ACROSS A FEDERATION IN A NETWORK

TECHNICAL FIELD

The present disclosure relates generally to methods of identifying objects, e.g., resources, across a federation in a network, and more particularly, to identifying objects, e.g., resources, across a federation of access networks, e.g., fabric networks, for extending access of the objects across the federation in a network.

BACKGROUND

Business requirements (business continuance, disaster avoidance, etc.) lead to the deployment of separate data center access networks, e.g., fabric networks, which need to be interconnected with each other. For example, multi-pod architecture generally has separate application centric infrastructure (ACI) fabrics, each running separate instances of control-plane protocols and interconnected through an external internet protocol (IP) routed network.

When interconnecting multiple fabrics, some resources need to be stretched across fabric sites. One approach (current ACI approach for instance) is to have a controller managing all the fabrics. When an application needs to be present in multiple fabrics, this controller deploys the application wherever it is needed. This approach has some limitations though, most important of which is its static nature: once a resource is deployed to a site, there is no way to dynamically and easily reclassify it. Reclassification requires resources to be deleted and recreated by the controller.

For example, an application may be deployed across multiple fabrics. However, in one particular fabric, it has been discovered that the application is either under attack or has been compromised. In light of this, it is necessary to prevent any access to this application from other fabrics. Essentially, the application should no longer be perceived as an extension of the same applications running in the other fabrics. If a controller were used to oversee all the fabrics, the only viable option would be to delete the application from the fabric where it has been compromised. However, this solution is not acceptable since it affects performance of the fabrics of the network and requires time and resources to delete and recreate the application.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
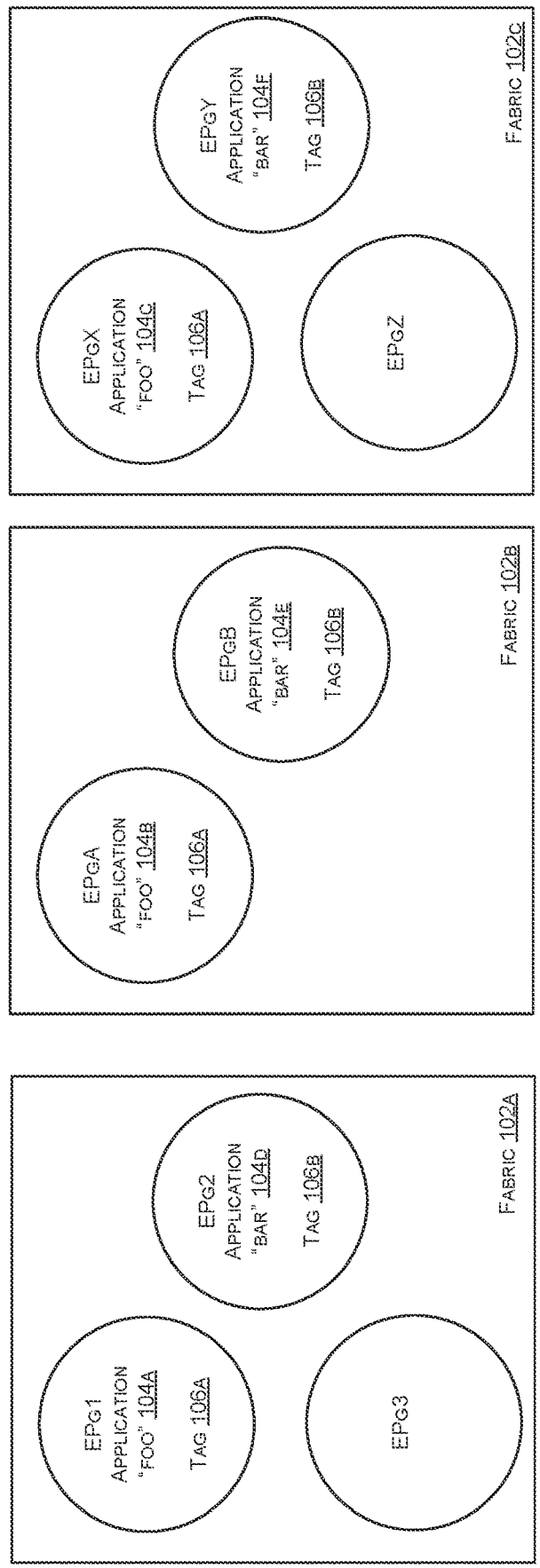
FIGS. 1A-1C schematically illustrate an example of a portion of a network that includes three fabrics configured as a federation that extends access of objects, e.g., resources, across the federation using global tags, in accordance with techniques and architecture described herein.

The present disclosure provides techniques and architecture for identifying objects, e.g., resources, across a federation in a network, and more particularly, to identifying objects, e.g., resources, across a federation of access networks, e.g., fabric networks, for extending access of the objects across the federation in a network. More particularly, the techniques and architecture provide for adding global tags to local resources within an access network, e.g., a fabric network. Once a resource has a global tag attached to it, this information is shared with all other fabrics. Each fabric can then build its own view of where global resources are located. A local resource with the same set of global tags may be seen as the same global resource across multiple fabrics. Simply changing global tags attached to a local resource allows for reclassifying local resources. No other configuration change is required. While the techniques and architecture are described herein primarily with respect to access networks, e.g., fabric networks, it should be noted the techniques and architecture described herein are also applicable to other scenarios where resources are shared within various clusters or arrangements, e.g., Kubernetes.

As an example, a method may include providing a first network resource within a first cluster of network resources and assigning a tag to the first network resource, wherein the tag represents characteristics of the first network resource. The method may also include providing a second network resource within a second cluster of network resources, and assigning the tag to the second network resource, wherein the tag represents characteristics of the second network resource. The method may further include providing, by the first cluster of network resources to the second cluster of network resources, a first list of network resources within the first cluster of network resources, wherein the first list of network resources comprises an identifier of the first network resource and the tag associated with the first network resource. The method may also include providing, by the second cluster of network resources to the first cluster of network resources, a second list of network resources within the second cluster of network resources, wherein the second list of network resources comprises an identifier of the second network resource and the tag associated with the second network resource, and exchanging network traffic between the first network resource and the second network resource.

Example Embodiments

In accordance with configurations described herein, as previously noted, techniques and architecture are described herein for identifying objects, e.g., resources, across a federation in a network, and more particularly, to identifying objects, e.g., resources, across a federation of access networks, e.g., fabric networks, for extending access of the objects across the federation in a network. More particularly, the techniques and architecture provide for adding global tags to local resources within an access network, e.g., a fabric network. Once a resource has a global tag attached to it, this information is shared with all other fabrics. Each fabric can then build its own view of where global resources are located. A local resource with the same set of global tags may be seen as the same global resource across multiple fabrics. Simply changing global tags attached to a local resource allows for reclassifying local resources. No other configuration change is required.

As previously noted, when interconnecting multiple fabrics, some resources need to be stretched across fabric sites. One approach (current ACI approach for instance) is to have a controller managing all the fabrics. When an application needs to be present in multiple fabrics, this controller deploys the application wherever it is needed. This approach has some limitations though, most important of which is its static nature: once a resource is deployed to a site, there is no way to dynamically and easily reclassify the resource. Reclassification requires resources to be deleted and recreated by the controller.

For example, an application may be deployed across multiple fabrics. However, in one particular fabric, it has been discovered that the application is either under attack or has been compromised. In light of this, it is necessary to prevent any access to this application from other fabrics. Essentially, the application should no longer be perceived as an extension of the same applications running in the other fabrics. If a controller were used to oversee all the fabrics, the only viable option would be to delete the application from the fabric where it has been compromised. However, this solution is not acceptable since it affects performance of the fabrics of the network and requires time and resources to delete and recreate the application.

Thus, consider an application that has been deployed across multiple fabrics, e.g., a federation of fabrics within a network. However, in one particular fabric, it is discovered that the application is either under attack or has been compromised. In light of this, any access to this application from other fabrics should be prevented. Essentially, the application should not be perceived as an extension of the same applications running in the other fabrics. If current techniques are employed using a controller overseeing all the fabrics, the only viable option is to delete the application from the fabric where it has been compromised, which is not acceptable.

Accordingly, all that is needed is to indicate at any point of time that this resource in this specific fabric, globally represents this specific asset. Accordingly, in configurations, global tags are introduced. In some configurations, each global tag is a key, value pair. Global tags are used to globally identify and organize resources based on specific characteristics or attributes. Resources with the same set of global tags in different fabrics, represent the same asset. Each fabric collects information on all resources with at least a global tag. This information is exchanged with all other fabrics.

For example, consider a scenario where there is a federation in a network. The federation includes three fabrics. A first application, "foo," may be represented by endpoint group 1 (EPg1) in fabric 1 and EPgA in fabric 2. A second application, "bar," may be represented by EPg2 in fabric1, EPgB in fabric 2, and EPgX in fabric 3.

If it is determined that EPgA has been compromised and therefore should not be seen as an extension of EPg1 in fabric 1, all that needs to be done is remove/adjust the global tags. As soon as this occurs, fabric 2 may send an updated list containing global resources to all other fabrics. Fabric 1 may react by detecting EPgA global tags are not the same as the global tags of EPg1. This means that EPgA is not an extension of EPg1 anymore. Traffic may thus stop flowing between EPg1 and EPgA.

In configurations, in order to optimize the amount of information exchanged across fabrics, a regular hash approach may be taken. Each fabric may send a hash of its local table (containing local resources and the attached global tags). Upon receiving the message, the receiving fabric may simply hack if the hash has not changed. Otherwise, the receiving fabric may request that sending fabric send the full table. In configurations, this exchange mechanism may also be used as a keep-alive mechanism.

Thus, all three fabrics form a federation within a network. Objects in each fabric may be tagged. Each fabric collects objects that are tagged and dynamically reacts to any configuration change (tags added/deleted/updated, tagged objects being added/deleted/updated, etc.). Any time a change happens, each fabric exchanges this information with the other fabrics in the federation. This is possible because in configurations, only differences compared to previous exchanged information may be shared. By looking at object classes and tags, each fabric independently understands which objects in other fabrics are an extension of objects that reside in that fabric. Consequently, each fabric acts to program all that is necessary for such objects to be seen as extension of each other. In configurations, in ACI, translation tables are programmed so traffic may flow. Thus, a user only need program their devices so traffic can flow from one fabric to another considering which objects are stretched across fabrics. In such a scenario, if one service in a fabric gets compromised, all that user is required to do is to remove tags. Immediately the fabric federation will respond to such a change by isolating the service in such fabric with no impact in any other service (stretched or not) in such a fabric or any other fabric part of the federation.

Configuration may be independently created in each of the different fabrics (likely by different admins) or in a central place (if a single admin manages all the fabrics) and from there pushed to all federated fabrics. Objects may be tagged at any point in time. When objects are tagged, information on tagged objects is automatically collected by ACI and exchanged with the other federated fabrics. Each federated fabric, independently, figures out which objects in other fabrics are an extension of its own objects. For any such object, ACI implicitly adds the necessary configuration so that: (i) traffic can leave the fabric directed to the correct destination fabric; and (ii) when traffic reaches the destination fabric, the traffic is processed by the destination fabric as if internally generated (this configuration can be understood not just by ACI spines but also by standalone routers). Since each fabric independently acts, there is no single point of failure when reacting to changes.

In configurations, each ACI automatically discovers stretched resources, reacts to changes and independently configures all that is necessary for traffic to flow from one fabric to another, as well as have a hardware that allows translation tables to be programmed accordingly.

Accordingly, as an example, a network has three different fabrics: fabric_a, fabric_b, and fabric_c. In configurations, a user may configure the three fabrics to form a federation. A simple policy in each fabric may contain the information on how to reach and communicate with the other two fabrics. In the case of ACI, there will be a new service running in each fabric. In each fabric this service will reach to other services in the other fabric. A federation is formed.

The user configures each fabric independently. When the user wants to indicate that different resources in different fabrics of the federation are an extension of each other, the user tags those resources. For instance, by adding the same set of tags to the following resources fabric_a resource_a, fabric_b resource_b, and fabric_c resource_c, a service running in fabric_a notices that resource_a has been tagged. The service may share this information with services running in fabric_b and fabric_c. At the same time the service running in fabric_a receives a message from a service running in fabric_b indicating that resource_b has been tagged, and a message from a service running in fabric_c indicating that resource_c has been tagged.

The service running in fabric_a at this point may independently build its own view of the federation. Because tags added by the user on those resources are the same, the service in fabric_a understands those resources are to be treated as extensions.

In the case of ACI, if the resource is an EndPointGroup, the service in fabric_a may program ACI so that traffic can flow. Whatever traffic in fabric_a is allowed to reach EndPointGroup_A may now also automatically reach EndPointGroup_B in fabric_b and EndPointGroup_C in fabric_c.

The same mechanism independently happens in all the other fabrics that are part of the federation. Thus, this is a decentralized approach that uses tags to identify resources stretched across fabrics so traffic can flow.

If the ACI fabrics are replaced with a Kubernetes cluster, in configurations an agent running in each cluster forms a federation with other agents running in other clusters. Those agents watch for objects with tags and exchange this information with other agents. Each agent builds its own view of the federation. When an agent detects a service is stretched across clusters, the agent may program NetworkPolicy, DNS and Gateway so that traffic can flow.

In configurations, if a user discovers that a service in one of the fabrics has been compromised, the only thing the user needs to do is remove the tag from the compromised resource. Potentially tag removals may be done automatically based on a service behavior. Because of this simple user action (tag removed), an agent running in that fabric may propagate the change to other agents. The agents in the other fabrics may independently react by detecting that the compromised resource is not to be seen as an extension anymore, and changing the configuration so that this resource is not reachable anymore from other fabrics. No other resource is impacted. No other change is required. Such a decentralized solution also provides users with visibility on which resources are seen to be stretched across many fabrics.

Accordingly, in configurations, a method includes providing a first network resource within a first cluster of network resources and assigning a tag to the first network resource, wherein the tag represents characteristics of the first network resource. The method also includes providing a second network resource within a second cluster of network resources and assigning the tag to the second network resource, wherein the tag represents characteristics of the second network resource. The method further includes providing, by the first cluster of network resources to the second cluster of network resources, a first list of network resources within the first cluster of network resources, wherein the first list of network resources comprises an identifier of the first network resource and the tag associated with the first network resource. The method also includes providing, by the second cluster of network resources to the first cluster of network resources, a second list of network resources within the second cluster of network resources, wherein the second list of network resources comprises an identifier of the second network resource and the tag associated with the second network resource, and exchanging network traffic between the first network resource and the second network resource.

In some configurations, the method also includes receiving, by the second cluster of network resources from the first cluster of network resources, a hash representing a third list of network resources within the first cluster of network resources; and based at least in part on the hash being identical to a previous hash received by the second cluster of network resources from the first cluster of network resources, hacking, by the second cluster of network resources, the hash.

In further configurations, the method additionally includes receiving, by the second cluster of network resources from the first cluster of network resources, a hash representing a third list of network resources within the first cluster of network resources; based at least in part on the hash being different with respect to a previous hash received by the second cluster of network resources from the first cluster of network resources, requesting, by the second cluster of network resources from the first cluster of network resources, the third list of network resources within the first cluster of network resources; receiving, by the second cluster of network resources from the first cluster of network resources, the third list of network resources, wherein the third list of network resources comprises the identifier of the first network resource without the tag associated with the first network resource; and based at least in part on the third list of network resources comprising the identifier of the first network resource without the tag associated with the first network resource, discontinuing exchanging of network traffic between the first network resource and the second network resource.

In additional configurations, the method further includes providing a third network resource within a third cluster of network resources; assigning the tag to the third network resource, wherein the tag represents characteristics of the third network resource; providing, by the first cluster of network resources to the third cluster of network resources, the first list of network resources within the first cluster of network resources; providing, by the second cluster of network resources to the third cluster of network resources, the second list of network resources within the second cluster of network resources; providing, by the third cluster of network resources to the first cluster of network resources, a third list of network resources within the third cluster of network resources, wherein the third list of network resources comprises an identifier of the third network resource and the tag associated with the third network resource; providing, by the third cluster of network resources to the second cluster of network resources, the second list of network resources within the second cluster of network resources; and exchanging network traffic between the first network resource, the second network resource, and the third network resource.

In further configurations, the method also includes receiving, by the second cluster of network resources from the first cluster of network resources, a hash representing a third list of network resources within the first cluster of network resources; based at least in part on the hash being identical to a previous hash received by the second cluster of network resources from the first cluster of network resources, hacking, by the second cluster of network resources, the hash; receiving, by the third cluster of network resources from the first cluster of network resources, a hash representing a third list of network resources within the first cluster of network resources; and based at least in part on the hash being identical to a previous hash received by the third cluster of network resources from the first cluster of network resources, hacking, by the third cluster of network resources, the hash.

In additional configurations, the method further includes receiving, by the second cluster of network resources from the first cluster of network resources, a hash representing a fourth list of network resources within the first cluster of network resources; based at least in part on the hash being different with respect to a previous hash received by the second cluster of network resources from the first cluster of network resources, requesting, by the second cluster of network resources from the first cluster of network resources, the fourth list of network resources within the first cluster of network resources; receiving, by the second cluster of network resources from the first cluster of network resources, the fourth list of network resources, wherein the fourth list of network resources comprises the identifier of the first network resource without the tag associated with the first network resource; based at least in part on the fourth list of network resources comprising the identifier of the first network resource without the tag associated with the first network resource, discontinuing exchanging of network traffic between the first network resource and the second network resource; receiving, by the third cluster of network resources from the first cluster of network resources, the hash representing fourth list of network resources within the first cluster of network resources; based at least in part on the hash being different with respect to a previous hash received by the third cluster of network resources from the first cluster of network resources, requesting, by the third cluster of network resources from the first cluster of network resources, the fourth list of network resources within the first cluster of network resources; receiving, by the third cluster of network resources from the first cluster of network resources, the fourth list of network resources; and based at least in part on the fourth list of network resources comprising the identifier of the first network resource without the tag associated with the first network resource, discontinuing exchanging of network traffic between the first network resource and the third network resource.

In configurations, the tag comprises a key-value pair.

Thus, the techniques and architecture provide for identifying objects, e.g., resources, across a federation in a network, and more particularly, to identifying objects, e.g., resources, across a federation of access networks, e.g., fabric networks, for extending access of the objects across the federation in a network. More particularly, the techniques and architecture provide for adding global tags to local resources within an access network, e.g., a fabric network. Once a resource has a global tag attached to it, this information is shared with all other fabrics. Each fabric can then build its own view of where global resources are located. A local resource with the same set of global tags may be seen as the same global resource across multiple fabrics. Simply changing global tags attached to a local resource allows for reclassifying local resources. No other configuration change is required.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
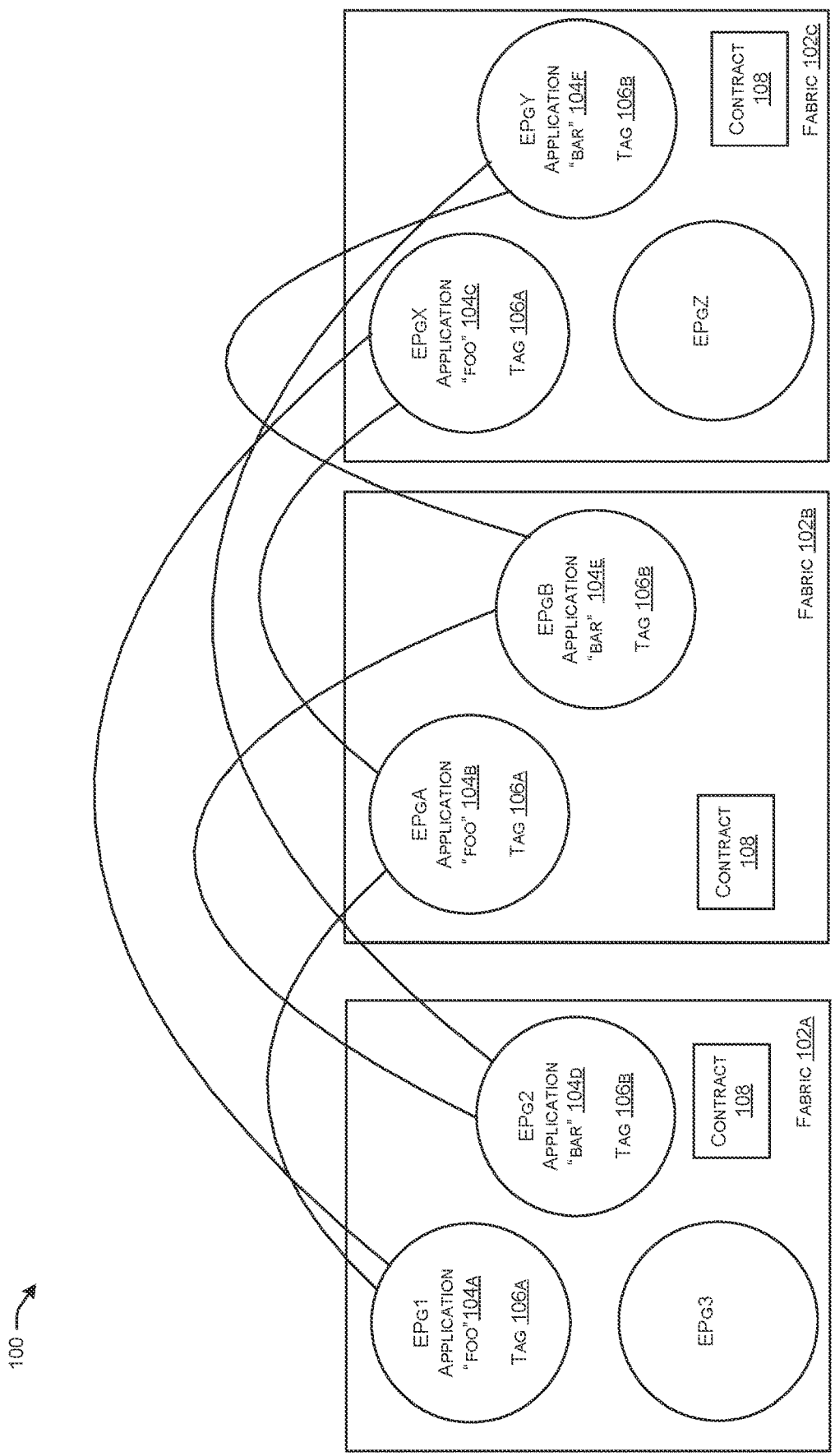
Figure 1C:
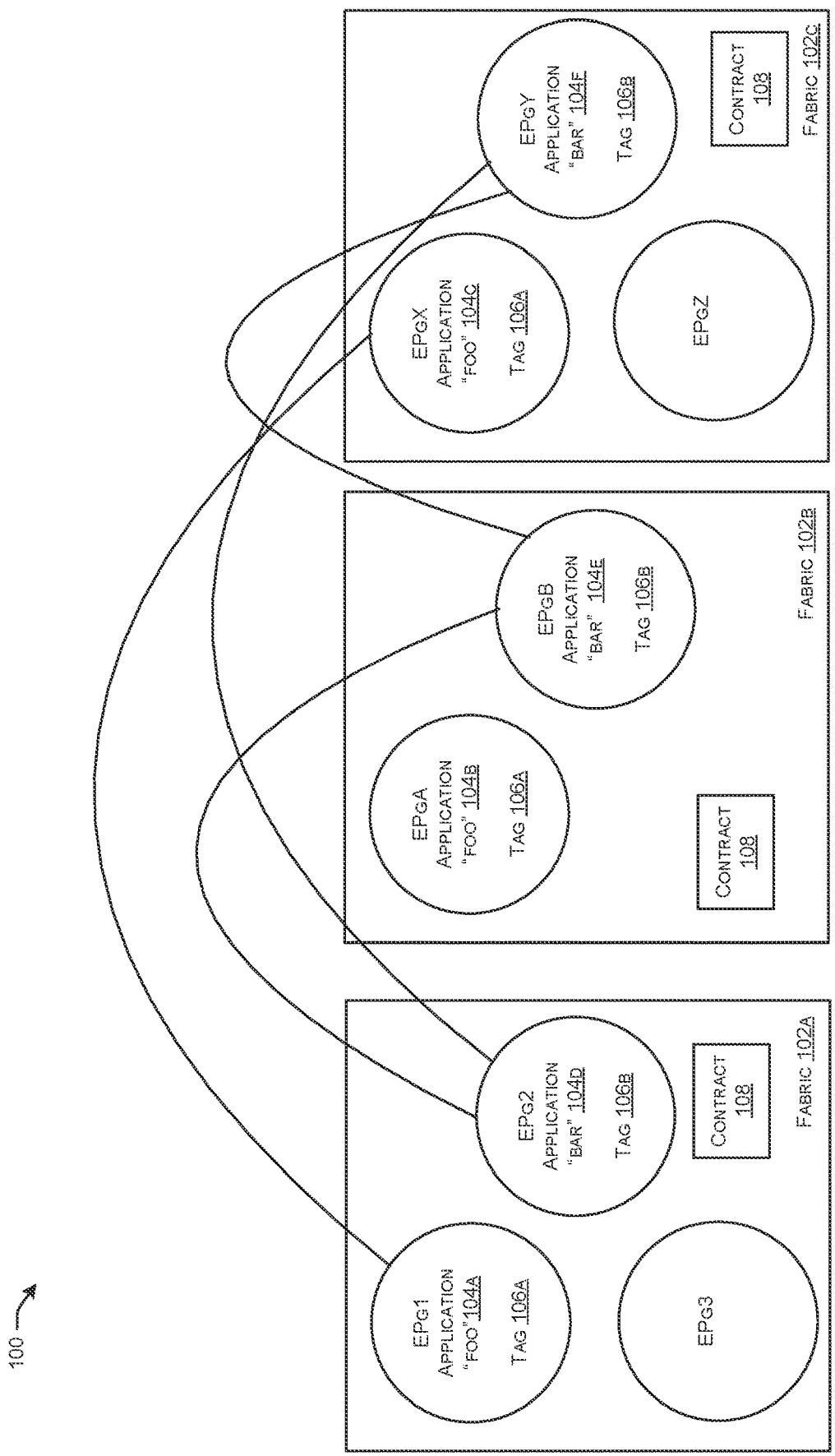

FIGS. 1A-1C schematically illustrate an example of a portion of a network 100 that includes three fabrics 102a, 102b, and 102c. The three fabrics 102a, 102b, and 102c may be configured as a federation of the network 100.

A first application 104a, 104b, and 104c may be deployed across the three fabrics 102a, 102b, and 102c, respectively. A second application 104d, 104e, and 104f may also be deployed across the three fabrics 102a, 102b, and 102c, respectively. In configurations, global tag 106a is introduced for the first application 104a, 104b, and 104c, while global tag 106b is introduced for the second application 104d, 104e, and 104f. In some configurations, each global tag 106a, 106b is a key-value pair. Global tags 106a 106b are used to globally identify and organize resources, (e.g., application 104a, 104b, and 104c, and application 104d, 104e, and 104f, respectively) based on specific characteristics or attributes. Resources with the same set of global tags in different fabrics, represent the same asset. Thus, application 104a, 104b, and 104c deployed across the three fabrics 102a, 102b, and 102c, respectively, represent the same asset. Application 104d, 104e, and 104f deployed across the three fabrics 102a, 102b, and 102c, respectively, represent the same asset. Thus, the fabrics 102a, 102b, and 102c are clusters of network resources. Each fabric 102a, 102b, and 102c collects information on all resources with at least a global tag within the fabric. In configurations, the information may include an identifier of the resource (e.g., one or more of a name of application (e.g., distinguished name (DN), an endpoint group identifier, etc.) and its corresponding global tag. In some configurations, the information may include just the global tag. This information is exchanged with all other fabrics.

Thus, the first application 104a, 104b, and 104c may be named "foo," and may be represented by EPg1 in fabric 102a, EPgA in fabric 102b, and EPgX in fabric 102c. The second application 104d, 104e, and 104f may be named "bar" and may be represented by EPg2 in fabric 102a, EPgB in fabric 102b, and EPgY in fabric 102c. The applications "foo" and "bar" may be named differently within each fabric 102a, 102b, and 102c. The global tags 106a and 106b are used to identify and represent resources as the same asset.

Referring to FIG. 1B, the global tags 106a and 106b may be added using a contract 108 among the fabrics 102a, 102b, and 102c. With the named applications 104a, 104b, 104c, 104d, 104e, and 104f, the proper global tags 106a and 106b may be added per the contract 108. Traffic may then flow among the applications 104a (EPg1), 104b (EPgA), and 104c (EPgX), as well as applications 104d (EPg2), 104e (EPgB), and 104f (EPgY).

Referring to FIG. 1C, if it is determined that EPgA in fabric 102b has been compromised and therefore should no longer be seen as an extension of EPg1 in fabric 102a or an extension of EPgX in fabric 102c, all that needs to be done is remove/adjust the global tag 106a. As soon as this occurs, fabric 102b may send an updated list containing global resources to the other fabrics 102a and 102b. Fabrics 102a and 102c may react by detecting EPgA global tags are no longer the same as the global tags of EPg1 and EPgX, respectively, e.g., EPgA has no tag or a tag different from tag 106a. This means that EPgA is not an extension of EPg1 or EPgX anymore. Traffic may thus stop flowing between EPg1 and EPgA, as well as between EPgX and EPgA. In configurations, once EPgA is back in service as an extension of EPg1 and EPgX, the tag 106a may be added to EPgA and this may be communicated to fabrics 102a and 102c.

In configurations, in order to optimize the amount of information exchanged across fabrics, a regular hash approach may be taken. Each fabric 102a, 102b, and 102c may send a hash of its local table (containing local resources and the attached global tags). Upon receiving the message, the receiving fabric may simply hack if the hash has not changed. Otherwise, the receiving fabric may request that sending fabric send the full table. In configurations, this exchange mechanism may also be used as a keep-alive mechanism.

Thus, all three fabrics 102a, 102b, and 102c form a federation within the network 100. Objects in each fabric 102a, 102b, and 102c may be tagged with tags, e.g., 106a and 106b. Each fabric 102a, 102b, and 102c collects objects that are tagged and dynamically reacts to any configuration change (tags added/deleted/updated, tagged objects being added/deleted/updated, etc.). Any time a change happens, each fabric 102a, 102b, and 102c exchanges this information with the other fabrics 102a, 102b, and 102c in the federation. This is possible because in configurations, only differences compared to previous exchanged information may be shared. By looking at object classes and tags, each fabric 102a, 102b, and 102c independently understands which objects in other fabrics are an extension of objects that reside in that fabric. Consequently, each fabric 102a, 102b, and 102c acts to program all that is necessary for such objects to be seen as extension of each other. In configurations, in ACI, translation tables are programmed so traffic may flow. Thus, a user only needs to program their devices so traffic can flow from one fabric to another considering which objects are stretched across fabrics. In such a scenario, if one service in a fabric gets compromised, all that user is required to do is to remove tags. Immediately the fabric federation will respond to such a change by isolating the service in such fabric with no impact in any other service (stretched or not) in such a fabric or any other fabric part of the federation. In configurations, once the service is back in operation, the proper tags may be added to the service and this may be communicated to the other fabrics so that they know that the service is once again available as an extension.

Configuration may be independently created in each of the different fabrics 102a, 102b, and 102c (likely by different admins) or in a central place (if a single admin manages all the fabrics) and from there pushed to all federated fabrics. Objects may be tagged at any point in time. When objects are tagged, information on tagged objects is automatically collected by ACI and exchanged with the other federated fabrics. Each federated fabric, independently, figures out which objects in other fabrics are an extension of its own objects. For any such object, ACI implicitly adds the necessary configuration so that: (i) traffic can leave the fabric directed to the correct destination fabric; and (ii) when traffic reaches the destination fabric, the traffic is processed by the destination fabric as if internally generated (this configuration can be understood not just by ACI spines but also by standalone routers). Since each fabric independently acts, there is no single point of failure when reacting to changes.

In configurations, each ACI may automatically discover stretched resources, react to changes and independently configure all that is necessary for traffic to flow from one fabric 102a, 10b, and/or 102c to another, as well as have hardware that allows translation tables to be programmed accordingly. More particularly, global tags may be added by ACI/tenant admins. Any resource containing a global tag, e.g., one of tags 106a, 106b, is considered by this process programmatically. This translates to coding a bi-directional contract, e.g., contract 108, for the global tag class. Parent of global tags may be collected and each ACI collects all such resources in a map. As previously noted, the tags may be key-value pairs. In configurations, the key may be the distinguished name (DN), e.g., an identifier, of the resource and the value may be a set of global tags attached to the resource.

Figure 2A:
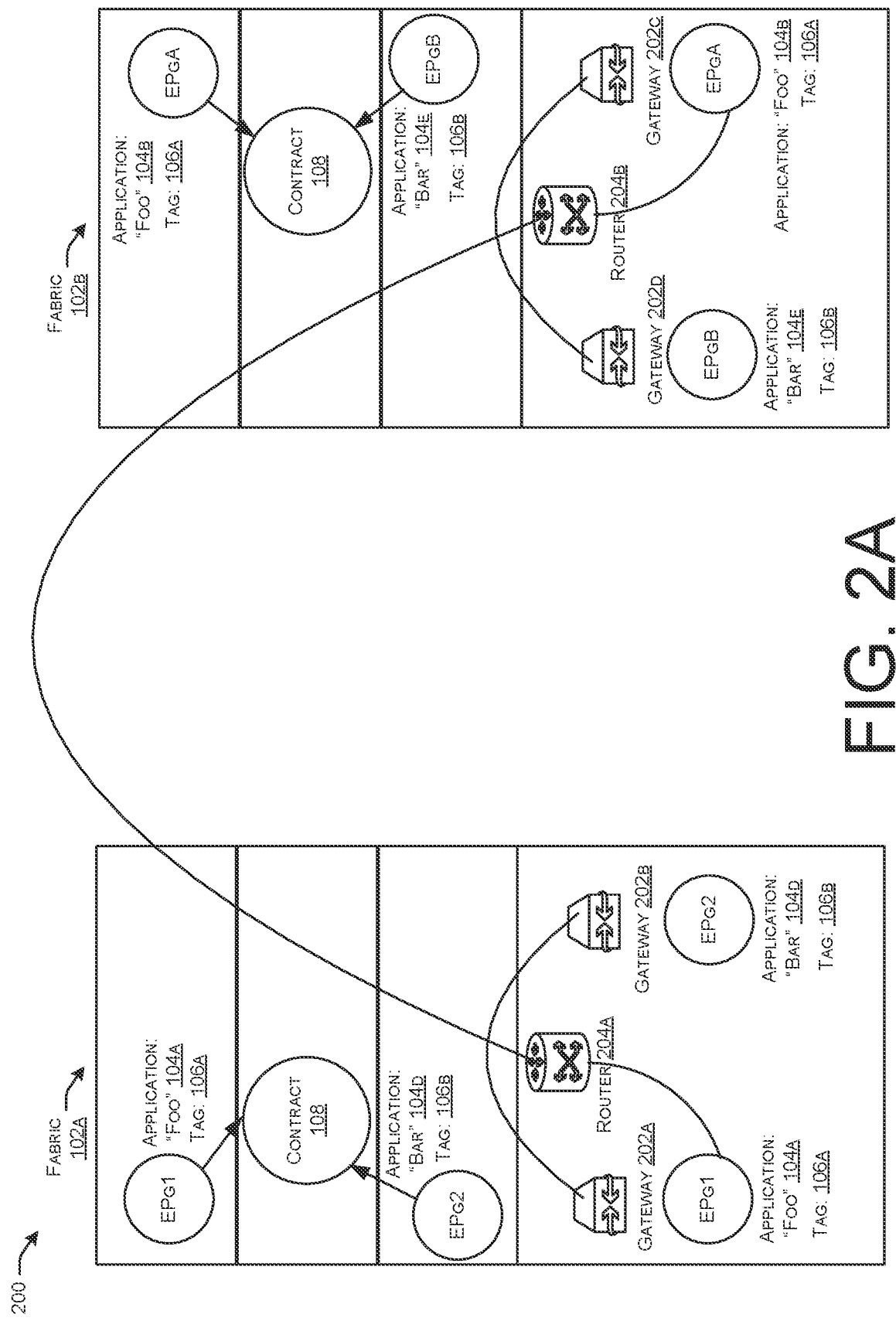
FIGS. 2A and 2B schematically illustrate an example of part of the portion of the example network of FIGS. 1A-1C that includes two of the fabrics, in accordance with techniques and architecture described herein
Figure 2B:
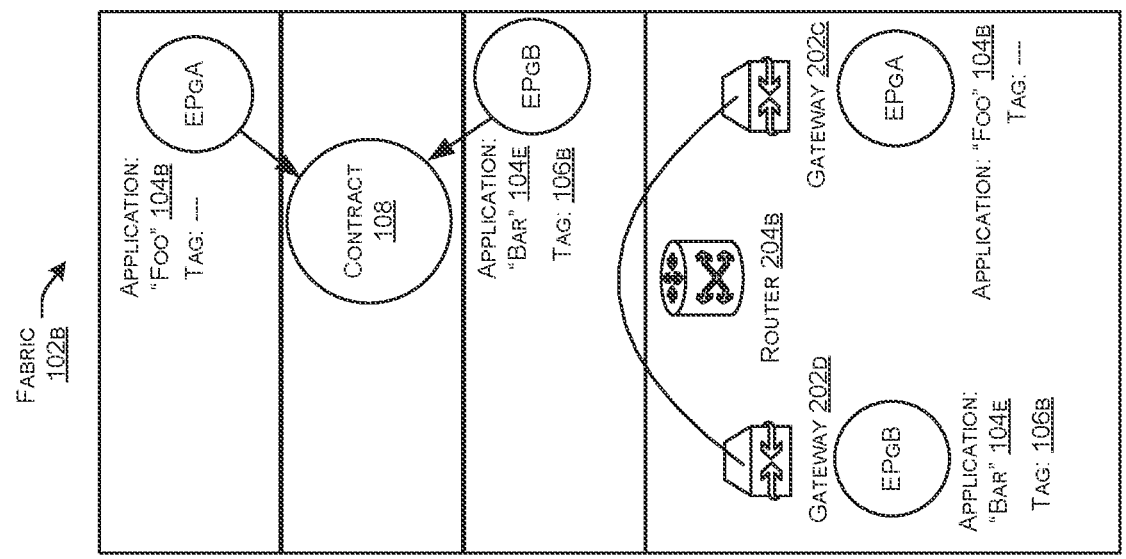
Figure 2B:
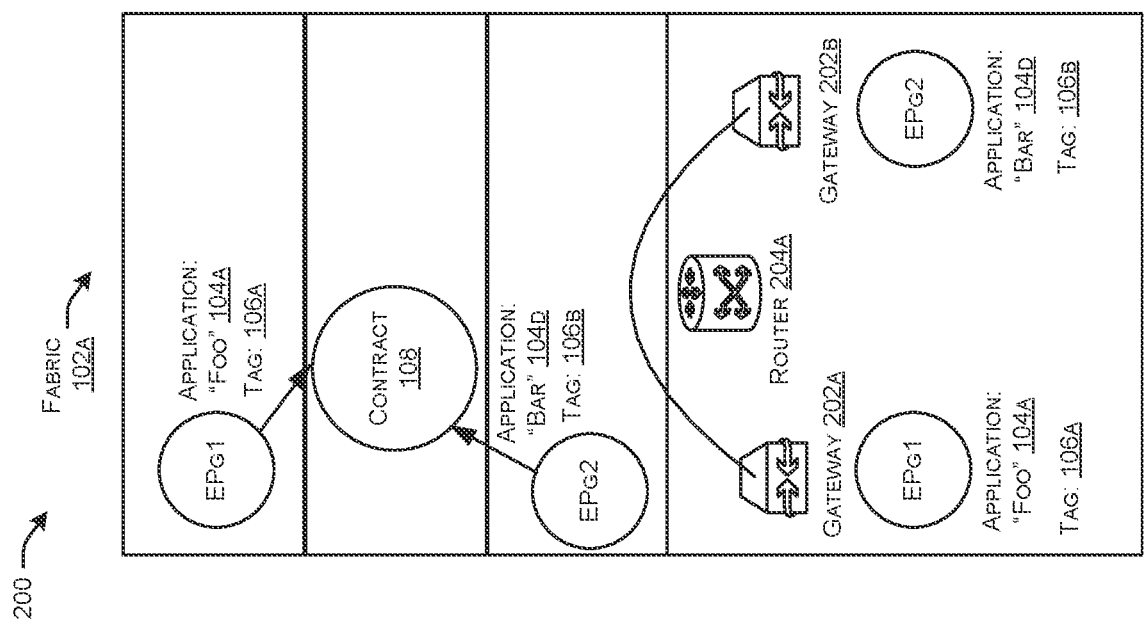

FIGS. 2A and 2B schematically illustrate an example of part 200 of the portion of the example network 100 of FIGS. 1A-1C that includes two of the fabrics, e.g., fabrics 102a and 102b. Fabric 102c is not illustrated for clarity. As previously noted, the first application 104a and 104b may be deployed across the fabrics 102a and 102b, respectively. The second application 104d and 104e may also be deployed across the fabrics 102a and 102b, respectively. In configurations, global tag 106a is introduced for the first application 104a and 104b, while global tag 106b is introduced for the second application 104d and 104e. In some configurations, each global tag 106a, 106b is a key-value pair. Global tags 106a and 106b are used to globally identify and organize resources, (e.g., application 104a and 104b and application 104d and, 104e, respectively) based on specific characteristics or attributes. Resources with the same set of global tags in different fabrics, represent the same asset. Thus, application 104a and 104b deployed across the fabrics 102a and 102b, respectively, represent the same asset. Application 104d and 104e deployed across the fabrics 102a and 102b, respectively, represent the same asset. Thus, the fabrics 102a and 102b are clusters of network resources. Each fabric 102a and 102b collects information on all resources with at least a global tag within the fabric. In configurations, the information may include an identifier of the resource (e.g., one or more of a name of application, (e.g., distinguished name (DN), an endpoint group identifier, etc.) and its corresponding global tag. In some configurations, the information may include just the global tag. This information is exchanged with all other fabrics.

Thus, the first application 104a and 104b may be named "foo," and may be represented by EPg1 in fabric 102a and EPgA in fabric 102b. The second application 104d and 104e may be named "bar" and may be represented by EPg2 in fabric 102a and EPgB in fabric 102b. The applications "foo" and "bar" may be named differently within each fabric 102a and 102b and 102c. The global tags 106a and 106b are used to identify and represent resources as the same asset. EPg1 may be implemented in a network device, e.g., gateway 202a and EPg2 may be implemented in another network device, e.g., gateway 202b. Gateway 202a and gateway 202b may communicate directly with each other. Likewise, EPgA may be implemented in a network device, e.g., gateway 202c and EPgB may be implemented in another network device, e.g., gateway 202d. Gateway 202c and gateway 202d may communicate directly with each other. Routers 204a and 204b may be used to for communication among network devices between fabrics 102a and 102b.

The global tags 106a and 106b may be implemented using the contract 108 among the fabrics 102a and 102b. More particularly, the global tags 106a, 106b may be added by ACI/tenant admins. Any resource containing a global tag, e.g., one of tags 106a, 106b, is considered by this process programmatically. This translates to coding a bi-directional contract, e.g., contract 108, for the global tag class. Parent of global tags may be collected and each ACI collects all such resources in a map. As previously noted, the tags may be key-value pairs. In configurations, the key may be the distinguished name (DN), e.g., an identifier, of the resource and the value may be a set of global tags attached to the resource. Thus, as can be seen in FIG. 2A, traffic may then flow among the applications 104*a* (EPg1) and 104*b* (EPgA) via routers 204*a* and 204*b*. While not shown in FIG. 2A for clarity, traffic may also flow among the applications 104*d* (EPg2) and 104*e* (EPgA) via routers 204*a* and 204*b*, as previously noted with respect to FIGS. 1A-1C.

Referring to FIG. 2B, if it is determined that EPgA in fabric 102*b* has been compromised and therefore should no longer be seen as an extension of EPg1 in fabric 102*a*, all that needs to be done is remove/adjust the global tag 106*a*, e.g., change it or eliminate it altogether. As soon as this occurs, fabric 102*b* may send an updated list containing global resources to the fabric 102*a*. Fabric 102*a* may react by detecting that EPgA global tags are no longer the same as the global tags of EPg1, e.g., EPgA has no tag or a tag different from tag 106*a*. This means that EPgA is not an extension of EPg1 anymore. Traffic may thus stop flowing between EPg1 and EPgA via the routers 204*a* and 204*b*. In configurations, once EPgA is back in service as an extension of EPg1, the tag 106*a* may be added to EPgA and this may be communicated to the fabric 102*a*.

Figure 3:
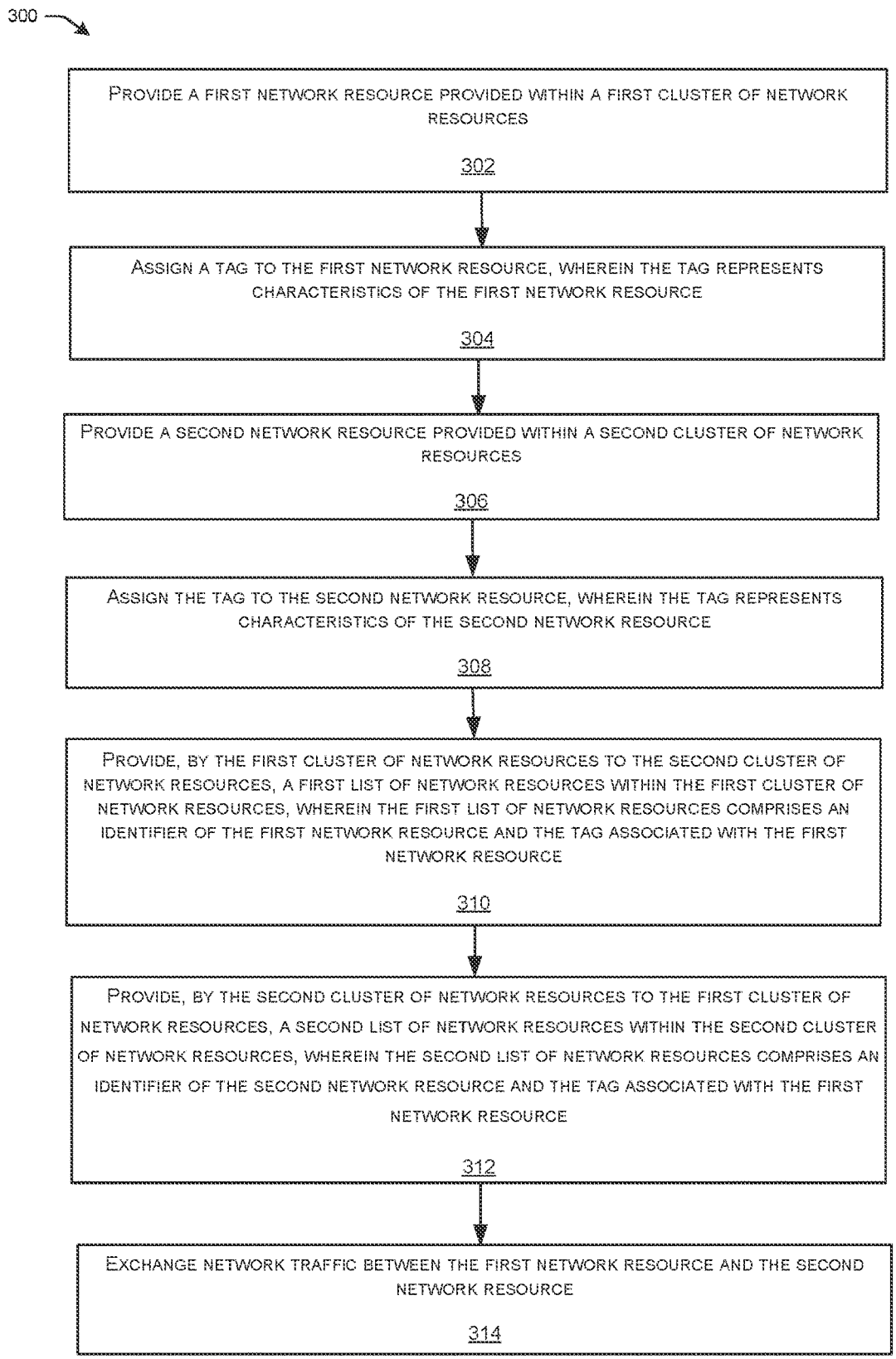
FIG. 3 illustrates a flow diagram of an example method for identifying objects, e.g., resources, across a federation of access networks, e.g., fabric networks, for extending access of the objects across the federation in a network, in accordance with the techniques and architecture described herein.

FIG. 3 illustrates a flow diagram of an example method 300 and illustrates aspects of the functions performed at least partly by devices of a network as described with respect to FIGS. 1A-1C, 2A, and 2B. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for identifying objects, e.g., resources, across a federation of access networks, e.g., fabric networks, for extending access of the objects across the federation in a network. In some examples, the method 300 may be performed by a system comprising one or more processors and one or more non-transitory computer-readable media storing computer-executable instructions that, when executed by the one or more processors, cause the one or more processors to perform the method 300.

At 302, a first network resource is provided within a first cluster of network resources. At 304 a tag is assigned to the first network resource, wherein the tag represents characteristics of the first network resource. For example, a first application 104*a*, 104*b*, and 104*c* may be deployed across the three fabrics 102*a*, 102*b*, and 102*c*, respectively. In configurations, global tag 106*a* is introduced for the first application 104*a*. In some configurations, each global tag is a key-value pair. Global tag 106*a* is used to globally identify and organize resources, (e.g., application 104*a*, 104*b*, and 104*c*, respectively) based on specific characteristics or attributes. Resources with the same set of global tags in different fabrics, represent the same asset. Thus, application 104*a*, 104*b*, and 104*c* deployed across the three fabrics 102*a*, 102*b*, and 102*c*, respectively, represent the same asset. Each fabric 102*a*, 102*b*, and 102*c* collects information on all resources with at least a global tag. This information is exchanged with all other fabrics.

At 306, a second network resource is provided within a second cluster of network resources. At 308 the tag to the second network resource, wherein the tag represents characteristics of the second network resource. For example, a first application 104*a*, 104*b*, and 104*c* may be deployed across the three fabrics 102*a*, 102*b*, and 102*c*, respectively. In configurations, global tag 106*a* is introduced for the first application 104*a*, 104*b*, and 104*c*. In some configurations, each global tag is a key-value pair. Global tag 106*a* is used to globally identify and organize resources, (e.g., application 104*a*, 104*b*, and 104*c*, respectively) based on specific characteristics or attributes. Resources with the same set of global tags in different fabrics, represent the same asset. Thus, application 104*a*, 104*b*, and 104*c* deployed across the three fabrics 102*a*, 102*b*, and 102*c*, respectively, represent the same asset. Each fabric 102*a*, 102*b*, and 102*c* collects information on all resources with at least a global tag. This information is exchanged with all other fabrics.

At 310, the first cluster of network resources provides to the second cluster of network resources, a first list of network resources within the first cluster of network resources, wherein the first list of network resources comprises an identifier of the first network resource and the tag associated with the first network resource. At 312, the second cluster of network resources provides to the first cluster of network resources, a second list of network resources within the second cluster of network resources, wherein the second list of network resources comprises an identifier of the second network resource and the tag associated with the second network resource. For example, each fabric 102*a*, 102*b*, and 102*c* collects objects that are tagged and dynamically reacts to any configuration change (tags added/deleted/updated, tagged objects being added/deleted/updated, etc.). Any time a change happens, each fabric 102*a*, 102*b*, and 102*c* exchanges this information with the other fabrics 102*a*, 102*b*, and 102*c* in the federation. This is possible because in configurations, only differences compared to previous exchanged information may be shared. By looking at object classes and tags, each fabric 102*a*, 102*b*, and 102*c* independently understands which objects in other fabrics are an extension of objects that reside in that fabric. Consequently, each fabric 102*a*, 102*b*, and 102*c* acts to program all that is necessary for such objects to be seen as extension of each other. In configurations, in ACI, translation tables are programmed so traffic may flow. Thus, a user only need program their devices so traffic can flow from one fabric to another considering which objects are stretched across fabrics. In such a scenario, if one service in a fabric gets compromised, all that user is required to do is to remove tags. Immediately the fabric federation will respond to such a change by isolating the service in such fabric with no impact in any other service (stretched or not) in such a fabric or any other fabric part of the federation. In configurations, once the service is back in operation, the proper tags may be added to the service and this may be communicated to the other fabrics so that they know that the service is once again available as an extension.

At 314, network traffic is exchanged between the first network resource and the second network resource.

Thus, the techniques and architecture provide for identifying objects, e.g., resources, across a federation in a network, and more particularly, to identifying objects, e.g., resources, across a federation of access networks, e.g., fabric networks, for extending access of the objects across the federation in a network. More particularly, the techniques and architecture provide for adding global tags to local resources within an access network, e.g., a fabric network. Once a resource has a global tag attached to it, this information is shared with all other fabrics. Each fabric can then build its own view of where global resources are located. A local resource with the same set of global tags may be seen as the same global resource across multiple fabrics. Simply changing global tags attached to a local resource allows for reclassifying local resources. No other configuration change is required.

Figure 4:
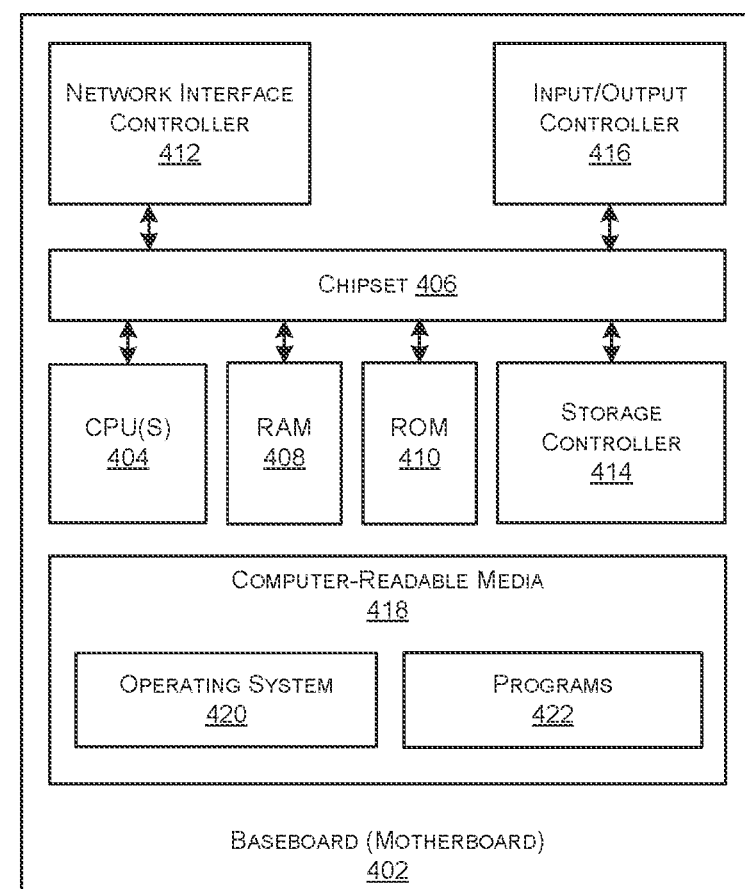
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1A-1C, 2A, 2B, and 3. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1A-1C, 2A, 2B, and 3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   providing a first network resource within a first cluster of network resources;
   assigning a tag to the first network resource, wherein the tag represents characteristics of the first network resource;
   providing a second network resource within a second cluster of network resources;
   assigning the tag to the second network resource, wherein the tag represents characteristics of the second network resource;
   providing, by the first cluster of network resources to the second cluster of network resources, a first list of network resources within the first cluster of network resources, wherein the first list of network resources comprises an identifier of the first network resource and the tag associated with the first network resource;
   providing, by the second cluster of network resources to the first cluster of network resources, a second list of network resources within the second cluster of network resources, wherein the second list of network resources comprises an identifier of the second network resource and the tag associated with the second network resource; and
   exchanging network traffic between the first network resource and the second network resource.

2. The method of claim 1, further comprising:
   receiving, by the second cluster of network resources from the first cluster of network resources, a hash representing a third list of network resources within the first cluster of network resources; and
   based at least in part on the hash being identical to a previous hash received by the second cluster of network resources from the first cluster of network resources, hacking, by the second cluster of network resources, the hash.

3. The method of claim 1, further comprising:
   receiving, by the second cluster of network resources from the first cluster of network resources, a hash representing a third list of network resources within the first cluster of network resources;
   based at least in part on the hash being different with respect to a previous hash received by the second cluster of network resources from the first cluster of network resources, requesting, by the second cluster of network resources from the first cluster of network resources, the third list of network resources within the first cluster of network resources;
   receiving, by the second cluster of network resources from the first cluster of network resources, the third list of network resources, wherein the third list of network resources comprises the identifier of the first network resource without the tag associated with the first network resource; and
   based at least in part on the third list of network resources comprising the identifier of the first network resource without the tag associated with the first network resource, discontinuing exchanging of network traffic between the first network resource and the second network resource.

4. The method of claim 1, further comprising:
providing a third network resource within a third cluster of network resources;
assigning the tag to the third network resource, wherein the tag represents characteristics of the third network resource;
providing, by the first cluster of network resources to the third cluster of network resources, the first list of network resources within the first cluster of network resources;
providing, by the second cluster of network resources to the third cluster of network resources, the second list of network resources within the second cluster of network resources;
providing, by the third cluster of network resources to the first cluster of network resources, a third list of network resources within the third cluster of network resources, wherein the third list of network resources comprises an identifier of the third network resource and the tag associated with the third network resource;
providing, by the third cluster of network resources to the second cluster of network resources, the second list of network resources within the second cluster of network resources; and
exchanging network traffic between the first network resource, the second network resource, and the third network resource.

5. The method of claim 4, further comprising:
receiving, by the second cluster of network resources from the first cluster of network resources, a hash representing a third list of network resources within the first cluster of network resources;
based at least in part on the hash being identical to a previous hash received by the second cluster of network resources from the first cluster of network resources, hacking, by the second cluster of network resources, the hash;
receiving, by the third cluster of network resources from the first cluster of network resources, a hash representing a third list of network resources within the first cluster of network resources; and
based at least in part on the hash being identical to a previous hash received by the third cluster of network resources from the first cluster of network resources, hacking, by the third cluster of network resources, the hash.

6. The method of claim 4, further comprising:
receiving, by the second cluster of network resources from the first cluster of network resources, a hash representing a fourth list of network resources within the first cluster of network resources;
based at least in part on the hash being different with respect to a previous hash received by the second cluster of network resources from the first cluster of network resources, requesting, by the second cluster of network resources from the first cluster of network resources, the fourth list of network resources within the first cluster of network resources;
receiving, by the second cluster of network resources from the first cluster of network resources, the fourth list of network resources, wherein the fourth list of network resources comprises the identifier of the first network resource without the tag associated with the first network resource;

based at least in part on the fourth list of network resources comprising the identifier of the first network resource without the tag associated with the first network resource, discontinuing exchanging of network traffic between the first network resource and the second network resource;
receiving, by the third cluster of network resources from the first cluster of network resources, the hash representing fourth list of network resources within the first cluster of network resources;
based at least in part on the hash being different with respect to a previous hash received by the third cluster of network resources from the first cluster of network resources, requesting, by the third cluster of network resources from the first cluster of network resources, the fourth list of network resources within the first cluster of network resources;
receiving, by the third cluster of network resources from the first cluster of network resources, the fourth list of network resources; and
based at least in part on the fourth list of network resources comprising the identifier of the first network resource without the tag associated with the first network resource, discontinuing exchanging of network traffic between the first network resource and the third network resource.

7. The method of claim 1, wherein the tag comprises a key-value pair.

8. A system comprising:
one or more processors; and
one or more non-transitory computer-readable media storing computer-executable instructions that, when executed by the one or more processors, cause the one or more processors to perform actions comprising:
providing a first network resource within a first cluster of network resources;
assigning a tag to the first network resource, wherein the tag represents characteristics of the first network resource;
providing a second network resource within a second cluster of network resources;
assigning the tag to the second network resource, wherein the tag represents characteristics of the second network resource;
providing, by the first cluster of network resources to the second cluster of network resources, a first list of network resources within the first cluster of network resources, wherein the first list of network resources comprises an identifier of the first network resource and the tag associated with the first network resource;
providing, by the second cluster of network resources to the first cluster of network resources, a second list of network resources within the second cluster of network resources, wherein the second list of network resources comprises an identifier of the second network resource and the tag associated with the second network resource; and
exchanging network traffic between the first network resource and the second network resource.

9. The system of claim 8, wherein the actions further comprise:
receiving, by the second cluster of network resources from the first cluster of network resources, a hash representing a third list of network resources within the first cluster of network resources; and based at least in part on the hash being identical to a previous hash received by the second cluster of network resources from the first cluster of network resources, hacking, by the second cluster of network resources, the hash.

10. The system of claim 8, wherein the actions further comprise:

receiving, by the second cluster of network resources from the first cluster of network resources, a hash representing a third list of network resources within the first cluster of network resources;

based at least in part on the hash being different with respect to a previous hash received by the second cluster of network resources from the first cluster of network resources, requesting, by the second cluster of network resources from the first cluster of network resources, the third list of network resources within the first cluster of network resources;

receiving, by the second cluster of network resources from the first cluster of network resources, the third list of network resources, wherein the third list of network resources comprises the identifier of the first network resource without the tag associated with the first network resource; and based at least in part on the third list of network resources comprising the identifier of the first network resource without the tag associated with the first network resource, discontinuing exchanging of network traffic between the first network resource and the second network resource.

11. The system of claim 8, wherein the actions further comprise:

providing a third network resource within a third cluster of network resources;

assigning the tag to the third network resource, wherein the tag represents characteristics of the third network resource;

providing, by the first cluster of network resources to the third cluster of network resources, the first list of network resources within the first cluster of network resources;

providing, by the second cluster of network resources to the third cluster of network resources, the second list of network resources within the second cluster of network resources;

providing, by the third cluster of network resources to the first cluster of network resources, a third list of network resources within the third cluster of network resources, wherein the third list of network resources comprises an identifier of the third network resource and the tag associated with the third network resource;

providing, by the third cluster of network resources to the second cluster of network resources, the second list of network resources within the second cluster of network resources; and exchanging network traffic between the first network resource, the second network resource, and the third network resource.

12. The system of claim 11, wherein the actions further comprise:

receiving, by the second cluster of network resources from the first cluster of network resources, a hash representing a third list of network resources within the first cluster of network resources;

based at least in part on the hash being identical to a previous hash received by the second cluster of network resources from the first cluster of network resources, hacking, by the second cluster of network resources, the hash;

receiving, by the third cluster of network resources from the first cluster of network resources, a hash representing a third list of network resources within the first cluster of network resources; and based at least in part on the hash being identical to a previous hash received by the third cluster of network resources from the first cluster of network resources, hacking, by the third cluster of network resources, the hash.

13. The system of claim 11, wherein the actions further comprise:

receiving, by the second cluster of network resources from the first cluster of network resources, a hash representing a fourth list of network resources within the first cluster of network resources;

based at least in part on the hash being different with respect to a previous hash received by the second cluster of network resources from the first cluster of network resources, requesting, by the second cluster of network resources from the first cluster of network resources, the fourth list of network resources within the first cluster of network resources;

receiving, by the second cluster of network resources from the first cluster of network resources, the fourth list of network resources, wherein the fourth list of network resources comprises the identifier of the first network resource without the tag associated with the first network resource;

based at least in part on the fourth list of network resources comprising the identifier of the first network resource without the tag associated with the first network resource, discontinuing exchanging of network traffic between the first network resource and the second network resource;

receiving, by the third cluster of network resources from the first cluster of network resources, the hash representing fourth list of network resources within the first cluster of network resources;

based at least in part on the hash being different with respect to a previous hash received by the third cluster of network resources from the first cluster of network resources, requesting, by the third cluster of network resources from the first cluster of network resources, the fourth list of network resources within the first cluster of network resources;

receiving, by the third cluster of network resources from the first cluster of network resources, the fourth list of network resources; and based at least in part on the fourth list of network resources comprising the identifier of the first network resource without the tag associated with the first network resource, discontinuing exchanging of network traffic between the first network resource and the third network resource.

14. The system of claim 8, wherein the tag comprises a key-value pair.

15. One or more non-transitory computer-readable media storing computer-executable instructions that, when executed by one or more processors, cause the one or more processors to perform actions comprising:

providing a first network resource within a first cluster of network resources;

assigning a tag to the first network resource, wherein the tag represents characteristics of the first network resource;
providing a second network resource within a second cluster of network resources;
assigning the tag to the second network resource, wherein the tag represents characteristics of the second network resource;
providing, by the first cluster of network resources to the second cluster of network resources, a first list of network resources within the first cluster of network resources, wherein the first list of network resources comprises an identifier of the first network resource and the tag associated with the first network resource;
providing, by the second cluster of network resources to the first cluster of network resources, a second list of network resources within the second cluster of network resources, wherein the second list of network resources comprises an identifier of the second network resource and the tag associated with the second network resource; and
exchanging network traffic between the first network resource and the second network resource.

16. The one or more non-transitory computer-readable media of claim 15, wherein the actions further comprise:
receiving, by the second cluster of network resources from the first cluster of network resources, a hash representing a third list of network resources within the first cluster of network resources; and
based at least in part on the hash being identical to a previous hash received by the second cluster of network resources from the first cluster of network resources, hacking, by the second cluster of network resources, the hash.

17. The one or more non-transitory computer-readable media of claim 15, wherein the actions further comprise:
receiving, by the second cluster of network resources from the first cluster of network resources, a hash representing a third list of network resources within the first cluster of network resources;
based at least in part on the hash being different with respect to a previous hash received by the second cluster of network resources from the first cluster of network resources, requesting, by the second cluster of network resources from the first cluster of network resources, the third list of network resources within the first cluster of network resources;
receiving, by the second cluster of network resources from the first cluster of network resources, the third list of network resources, wherein the third list of network resources comprises the identifier of the first network resource without the tag associated with the first network resource; and
based at least in part on the third list of network resources comprising the identifier of the first network resource without the tag associated with the first network resource, discontinuing exchanging of network traffic between the first network resource and the second network resource.

18. The one or more non-transitory computer-readable media of claim 15, wherein the actions further comprise:
providing a third network resource within a third cluster of network resources;
assigning the tag to the third network resource, wherein the tag represents characteristics of the third network resource;
providing, by the first cluster of network resources to the third cluster of network resources, the first list of network resources within the first cluster of network resources;
providing, by the second cluster of network resources to the third cluster of network resources, the second list of network resources within the second cluster of network resources;
providing, by the third cluster of network resources to the first cluster of network resources, a third list of network resources within the third cluster of network resources, wherein the third list of network resources comprises an identifier of the third network resource and the tag associated with the third network resource;
providing, by the third cluster of network resources to the second cluster of network resources, the second list of network resources within the second cluster of network resources; and
exchanging network traffic between the first network resource, the second network resource, and the third network resource.

19. The one or more non-transitory computer-readable media of claim 18, wherein the actions further comprise:
receiving, by the second cluster of network resources from the first cluster of network resources, a hash representing a third list of network resources within the first cluster of network resources;
based at least in part on the hash being identical to a previous hash received by the second cluster of network resources from the first cluster of network resources, hacking, by the second cluster of network resources, the hash;
receiving, by the third cluster of network resources from the first cluster of network resources, a hash representing a third list of network resources within the first cluster of network resources; and
based at least in part on the hash being identical to a previous hash received by the third cluster of network resources from the first cluster of network resources, hacking, by the third cluster of network resources, the hash.

20. The one or more non-transitory computer-readable media of claim 18, wherein the actions further comprise:
receiving, by the second cluster of network resources from the first cluster of network resources, a hash representing a fourth list of network resources within the first cluster of network resources;
based at least in part on the hash being different with respect to a previous hash received by the second cluster of network resources from the first cluster of network resources, requesting, by the second cluster of network resources from the first cluster of network resources, the fourth list of network resources within the first cluster of network resources;
receiving, by the second cluster of network resources from the first cluster of network resources, the fourth list of network resources, wherein the fourth list of network resources comprises the identifier of the first network resource without the tag associated with the first network resource;
based at least in part on the fourth list of network resources comprising the identifier of the first network resource without the tag associated with the first network resource, discontinuing exchanging of network traffic between the first network resource and the second network resource;

receiving, by the third cluster of network resources from the first cluster of network resources, the hash representing fourth list of network resources within the first cluster of network resources;

based at least in part on the hash being different with respect to a previous hash received by the third cluster of network resources from the first cluster of network resources, requesting, by the third cluster of network resources from the first cluster of network resources, the fourth list of network resources within the first cluster of network resources;

receiving, by the third cluster of network resources from the first cluster of network resources, the fourth list of network resources; and based at least in part on the fourth list of network resources comprising the identifier of the first network resource without the tag associated with the first network resource, discontinuing exchanging of network traffic between the first network resource and the third network resource.

\* \* \* \* \*